(12) United States Patent
Nakano

(10) Patent No.: US 6,888,275 B2
(45) Date of Patent: May 3, 2005

(54) AUTOMOTIVE ALTERNATOR HAVING HOUSING FOR REDUCING COOLING FAN NOISE

(75) Inventor: Kazutoshi Nakano, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/633,640

(22) Filed: Aug. 5, 2003

(65) Prior Publication Data

US 2004/0051406 A1 Mar. 18, 2004

(30) Foreign Application Priority Data

Sep. 12, 2002 (JP) ........................................ 2002-266252

(51) Int. Cl.⁷ ............................. H02K 5/00; H02K 9/06
(52) U.S. Cl. ......................................... 310/89; 310/58
(58) Field of Search .............................. 310/81, 58, 89, 310/68 D, 86

(56) References Cited

U.S. PATENT DOCUMENTS 5,650,675 A  7/1997 Kanaya et al.

6,417,585 B1 * 7/2002 Oohashi et al. ................ 310/58

FOREIGN PATENT DOCUMENTS

| FR | 2 745 439 | 8/1997 |
|---|---|---|
| GB | 1113850 | 5/1968 |
| JP | 7-79543 A | 3/1995 |
| JP | A 11-332178 | 11/1999 |

* cited by examiner

Primary Examiner—Burton S. Mullins
Assistant Examiner—Heba Y. Elkassabgi
(74) Attorney, Agent, or Firm—Oliff & Berridge, PLC

(57) ABSTRACT

An alternator for an automotive vehicle is substantially composed of a housing, a rotor having a field coil and a stator having stator coils. A cooling fan is connected to an axial end of the rotor. The stator is fixedly disposed in the housing and the rotor is rotatably supported in the housing. According to rotation of the rotor, alternating current is generated in the stator coils, and the alternating current is rectified into direct current to charge an on-board battery. Inlet ports for introducing cooling air into the housing are formed between spokes formed on an axial end wall of the housing. The spokes are slanted in the direction opposite to the rotational direction of the rotor relative to the radial direction to thereby reduce airflow noise generated around the spokes.

5 Claims, 6 Drawing Sheets

FRONT SIDE ←→ REAR SIDE

AUTOMOTIVE ALTERNATOR HAVING HOUSING FOR REDUCING COOLING FAN NOISE

CROSS-REFERENCE TO RELATED APPLICATION

This application is based upon and claims benefit of priority of Japanese Patent Application No. 2002-266252 filed on Sep. 12, 2002, the content of which is incorporated herein by reference.

BACKGROUND OF THE INVENTION

1. Field of the Invention

The present invention relates to an alternator for use in an automotive vehicle, the alternator including a cooling fan.

2. Description of Related Art

An alternator is usually mounted on an automotive vehicle. Alternating current generated in the alternator according to rotation of a rotor is rectified into a direct current, and the on-board battery is charged with the rectified direct current. Cooling fans are mounted on axial ends of the rotor for cooling stator coils. Outside air is sucked into the alternator through inlet ports formed on an axial end wall of a housing according to rotation of the cooling fan, and the cooling air is exhausted from outlet ports formed on a radial outer wall of the housing. In other words, the outside air introduced in the axial direction cools the stator coil and is exhausted in the radial direction of the housing.

Airflow noise is generated in the vicinity of the outlet ports because the cooling airflow is disturbed there. The cooling airflow is also disturbed in the vicinity of the inlet ports where ribs and spokes of the housing are formed. Therefore, airflow noise is also generated in the vicinity of the inlet ports.

Various proposals have been made hitherto to reduce the airflow noise in the vicinity of the outlet ports. Such proposals include: changing a shape of blades of the cooling fan; improving a form of a coil end of the stator coil; and changing a shape of the outlet ports. By utilizing one or more of these proposals, it has been possible to suppress disturbance of the airflow in the vicinity of the outlet ports and to reduce the airflow noise around the outlet ports.

On the other hand, to reduce the airflow noise generated around the inlet ports, WO-00/16467 proposes to tilt housing ribs in the direction opposite to the rotational direction of the rotor with respect to the radial direction. It proposes to set the tilt angle in a range from 25 to 35 degrees. However, it has been found out that the airflow noise is not sufficiently reduced by tilting the ribs. This is because the size of the ribs formed on the axial end wall of the housing is not large enough both in the axial direction and along the rotational direction of the rotor. The ribs are formed only for preventing foreign particles such as small stones or the like from entering into the housing through the inlet ports. Therefore, the ribs are made much smaller in size than spokes for connecting a bearing box to a cylindrical portion of the housing.

SUMMARY OF THE INVENTION

The present invention has been made in view of the above-mentioned problem, and an object of the present invention is to provide an improved alternator, in which the cooling airflow noise generated in the vicinity of the inlet ports is sufficiently reduced.

The alternator for use in an automotive vehicle includes a housing, a stator fixedly housed in the housing, and a rotor rotatably supported in the housing. A cooling fan is connected to an axial end surface of the rotor. When the rotor is rotated by an engine, alternating current is generated in stator coils disposed in the stator. The generated alternating current is rectified into direct current by a rectifier mounted on the alternator. The direct current is supplied to an on-board battery to charge it.

Plural spokes as structural members are formed on an axial end wall of the housing. Inlet ports for introducing cooling air are formed between each pair of neighboring spokes. Ribs are also formed in each inlet port to prevent foreign particles such as small stones from entering into the housing. Ribs are much smaller both in the width along a rotational direction of the rotor and in the axial length, compared with the spokes that serve as structural members.

When the cooling fan is rotated together with the rotor, cooling air is introduced from the inlet ports, and the stator coils disposed in the stator and a rotor coil wound on the rotor are cooled. In order to reduce airflow noise generated in the vicinity of the inlet ports, the spokes are tilted in a direction opposite to the rotational direction of the rotor with respect to radial lines extending from the rotational center of the rotor.

The tilt angle is set preferably in a range from 10° to 45°, and most preferably in a range from 10° to 25°. It is possible to tilt only some of the spokes in stead of tilting all the spokes. Both sides of each spoke may be tilted, or only one side of each spoke which is located downstream of the rotational direction of the rotor may be tilted.

According to the present invention, the airflow noise generated in the vicinity of the inlet ports is considerably reduced. Other objects and features of the present invention will become more readily apparent from a better understanding of the preferred embodiment described below with reference to the following drawings.

DETAILED DESCRIPTION OF THE PREFERRED EMBODIMENT

Figure 1:
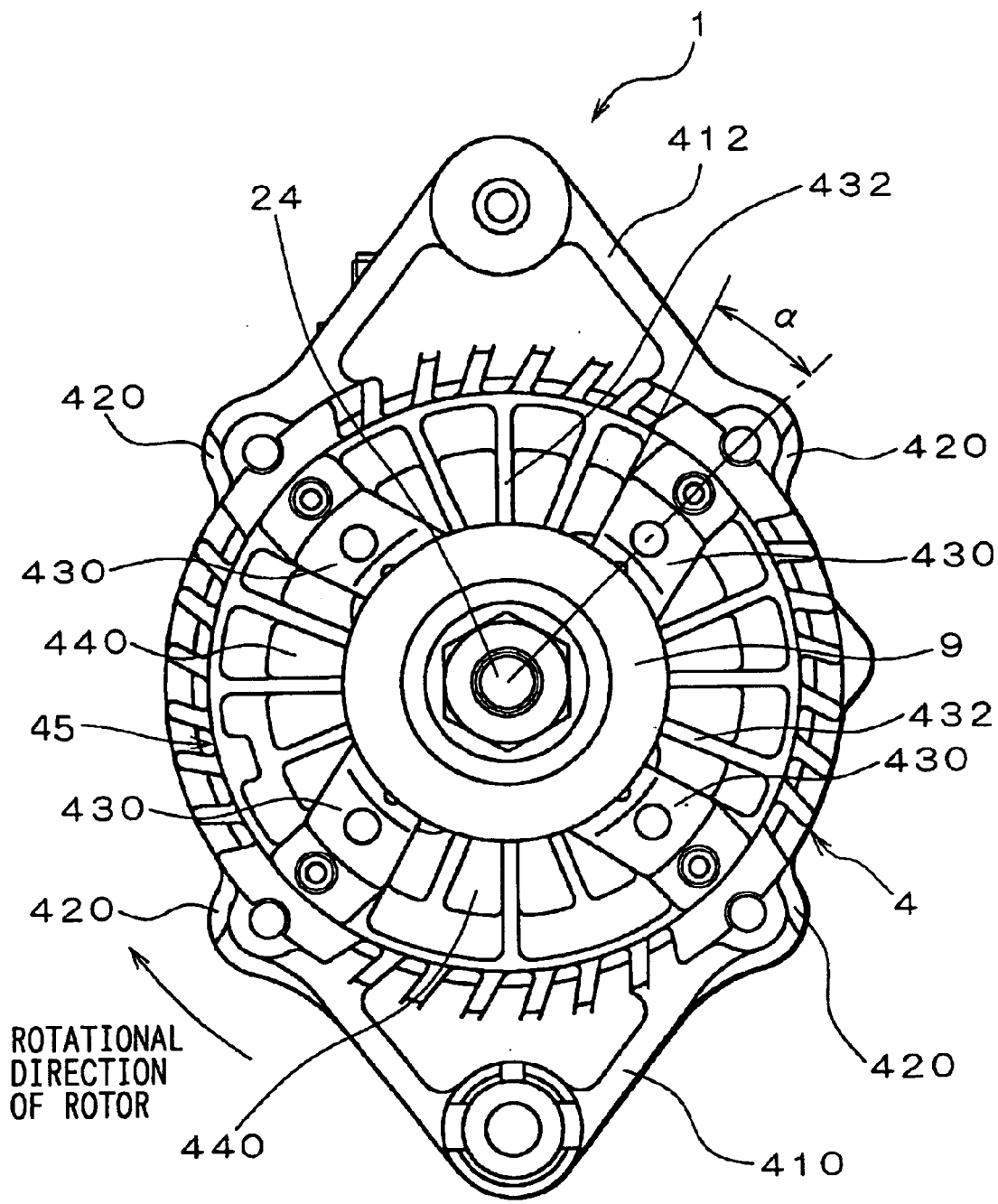
FIG. 1 is a plan view showing an alternator according to the present invention, viewed from a front side of the alternator.
Figure 2:
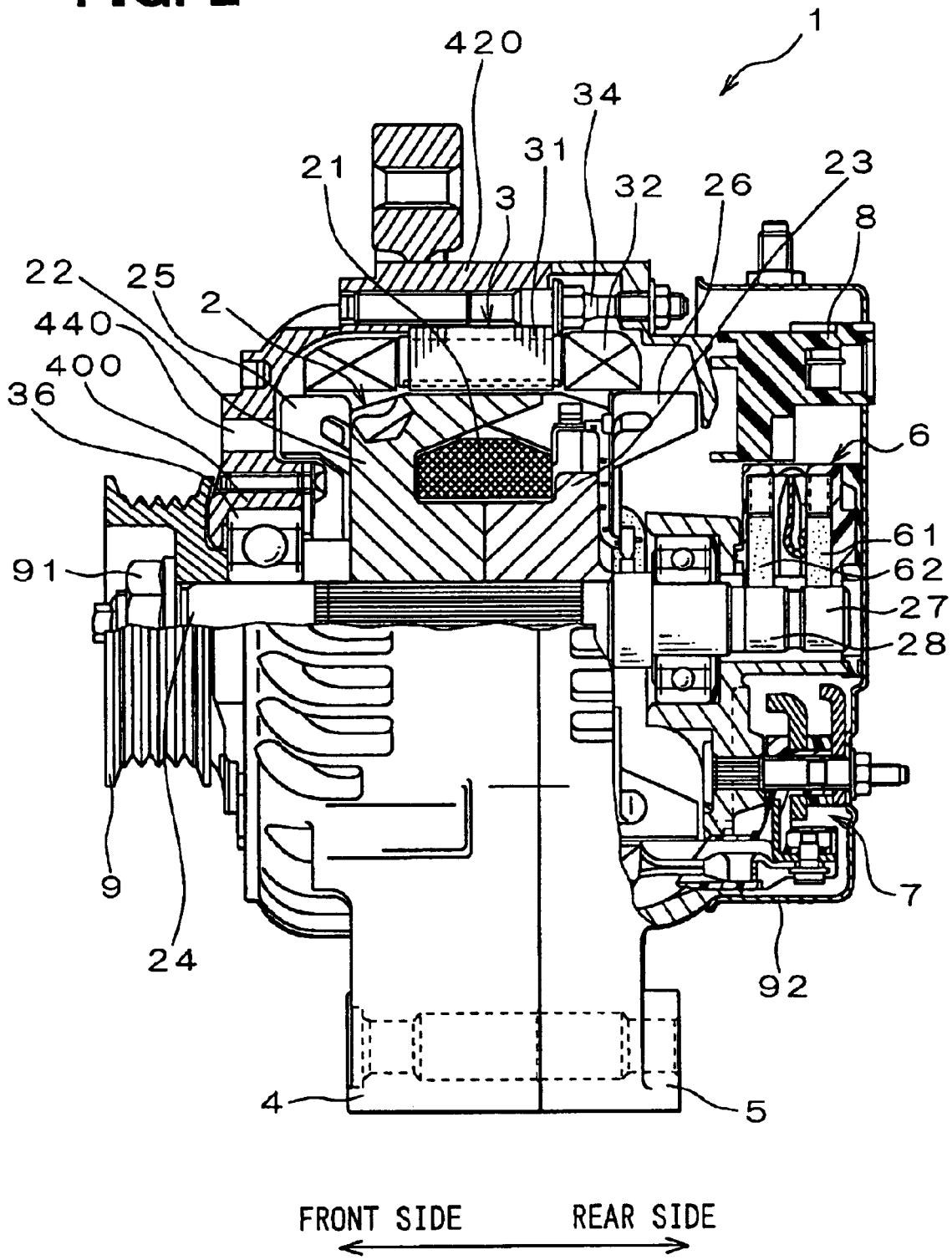
FIG. 2 is a cross-sectional view showing the alternator shown in FIG. 1.

A preferred embodiment of the present invention will be described with reference to FIGS. 1 and 2. An alternator 1 for use in an automotive vehicle includes a rotor 2, a stator 3, a front housing 4, a rear housing 5, a brush device 6, a rectifier 7, a voltage regulator 8 and other associated components.

The rotor 2 is composed of a pair of rotor cores 22, 23 fixedly connected to a rotor shaft 24 and a field coil 21 wound around a center boss formed by abutting the pair of rotor cores 22, 23 to each other. Each rotor core 22, 23 has six claws forming magnetic poles. A cooling fan 25 is connected to a front axial end surface of the rotor core 22 by welding or the like. The cooling fan 25 is an axial-flow-type fan or a combination of an axial-flow-type fan and a centrifugal fan. Cooling air is introduced into the alternator 1 from the front side thereof and exhausted in the radial direction. Similarly, another cooling fan 26 is connected to a rear axial end surface of the rotor core 23 by welding or the like. The cooling fan 26 is a centrifugal fan that introduces cooling air in the axial direction and exhausts it in the radial direction.

A pair of slip-rings 27, 28 is connected to the rear end portion of the rotor shaft 24. A pair of brushes 61, 62 held in a brush device 6 silidably contacts the pair of slip-rings to supply exciting current to the field coil 21 from a rectifier 7. The stator 3 is composed of a cylindrical stator core 31 and three phase stator coils 32 wound in slots formed in the stator core 31. The rectifier 7 is composed of a heat sink plate carrying plus rectifier elements thereon and another heat sink plate carrying minus rectifier elements thereon. The rectifier elements are electrically and mechanically connected to respective heat sink plates by soldering or the like. Alternating current generated in the stator 3 is rectified into a direct current by the rectifier 7.

An alternator housing is composed of a front housing 4 and the rear housing 5 which are connected to each other by four through-bolts 34 inserted into respective supporting portions 420 formed on the outer periphery of the housings 4, 5 with equal intervals therebetween. The stator 3 is fixedly held between the front housing 4 and the rear housing 5. The rotor 2 is disposed in an inner bore of the stator 3 with a small air gap therebetween. The rotor 2 is rotatably supported by a bearing 36 held in the front housing 4 and another bearing held in the rear housing 5.

The voltage regulator 8 controls an amount of current supplied to the field coil 21, and thereby the output voltage of the alternator is kept at a predetermined level. The pulley 9 is fixedly connected to a front end of the rotor shaft 24 with a nut 91. The rotor 2 is rotated by an engine (not shown) through a belt coupling the pulley 9 to the engine. A rear cover 92 is disposed at the rear side of the alternator 1 to cover the brush device 6, the rectifier 7 and the voltage regulator 8.

A magnetic field is generated in the rotor 2 by supplying excitation current to the field coil 21, while the rotor 2 is rotated by engine. The rotor 2 rotates in the direction shown in FIG. 1 (in the clockwise direction viewed from the front side of the alternator 1). Three-phase alternating current is generated in the stator coils 32, and the generated alternating current is rectified into direct current by the rectifier 7. The direct current is supplied to the on-board battery to charge it.

The cooling fan 25 connected to the front end surface of the rotor core 22 rotates together with the rotor 2 in the same direction as the rotor 2. According to the rotation of the cooling fan 25, cooling air is introduced into the alternator 1 through the inlet ports 440 formed on the axial end wall 45 of the front housing 4. The field coil 21 is cooled by an axial component of the cooling airflow, and a front coil end of the stator coils 32 is cooled by a radial component of the cooling airflow.

Similarly, the other cooling fan 26 connected to the rear end surface of the rotor core 23 is also rotated together with the rotor 2. According to the rotation of the cooling fan 26, cooling air is introduced into the alternator 1 and is blown to the rectifier 7 and the voltage regulator 8, and then to a rear coil end of the stator coils 32. The cooling air is finally exhausted from rear housing 5 in the radial direction. Thus, the rectifier 7, the voltage regulator 8 and the rear coil end are cooled.

Now, the front housing 4 will be described in detail with reference to FIGS. 1 and 2. The front housing 4 is substantially cup-shaped and includes an axial end wall 45 and a cylindrical portion connected to the axial end wall 45. A bearing box 400 for containing the bearing 36 therein is formed at the center portion of the axial end wall 45 and is supported by four spokes 430 each extending from the bearing box 400 toward the cylindrical portion of the front housing 4. Mounting stays 410, 412 for mounting the alternator 1 on an engine block are formed to extend upwardly and downwardly from the front housing 4. Four supporting portions 420, in which the through-bolts 34 for connecting the front housing 4 to the rear housing 5 are inserted, are formed at foot portions of the mounting stays 410, 412 at an equal interval among them.

An opening for introducing the cooling air into the front housing 4 is formed between each pair of neighboring spokes, and the opening is divided into plural inlet ports 440 by ribs 432 formed in the opening. The ribs 432 extend substantially in the radial direction. The spokes 430 are formed to have a sufficient mechanical strength to support the bearing box 400 that in turn supports the rotor 2. On the other hand, the ribs 432 are formed to have a much less mechanical strength because they are used only for preventing foreign particles such as small stones from entering into the alternator.

Figure 3:
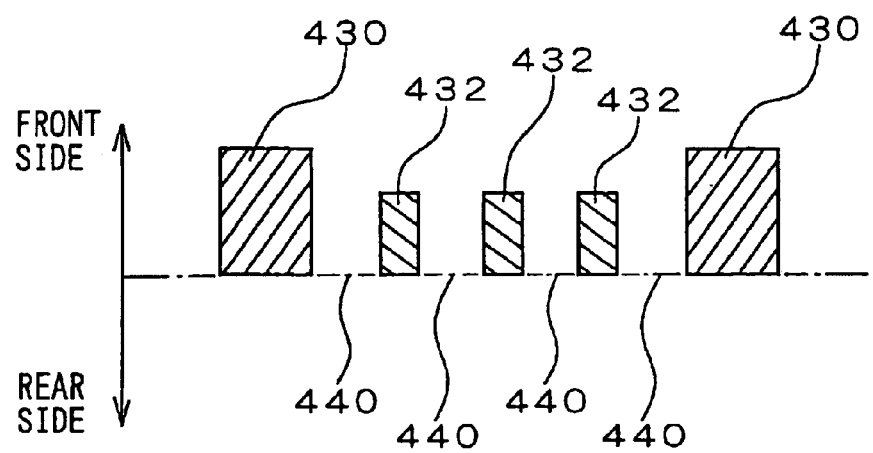
FIG. 3 is a schematic view showing heights of spokes and ribs formed on an axial end wall of a front housing.

FIG. 3 shows a cross-sectional view of the spokes 430 and the ribs 432, exploded along the rotational direction of the rotor 2. As shown in FIG. 3, the height of the spoke 430 in the axial direction is higher than that of the rib 432, and the width of the spoke 430 along the rotational direction is wider than that of the rib 432. To reduce the airflow noise in the vicinity of the inlet ports 440, each spoke 430 is tilted in a direction opposite to the rotational direction of the rotor 2 with respect to radial line extending from the rotational center of the rotor 2, as shown in FIG. 1. The tilt angle α is set in a range from 10° to 45°.

Figure 4:
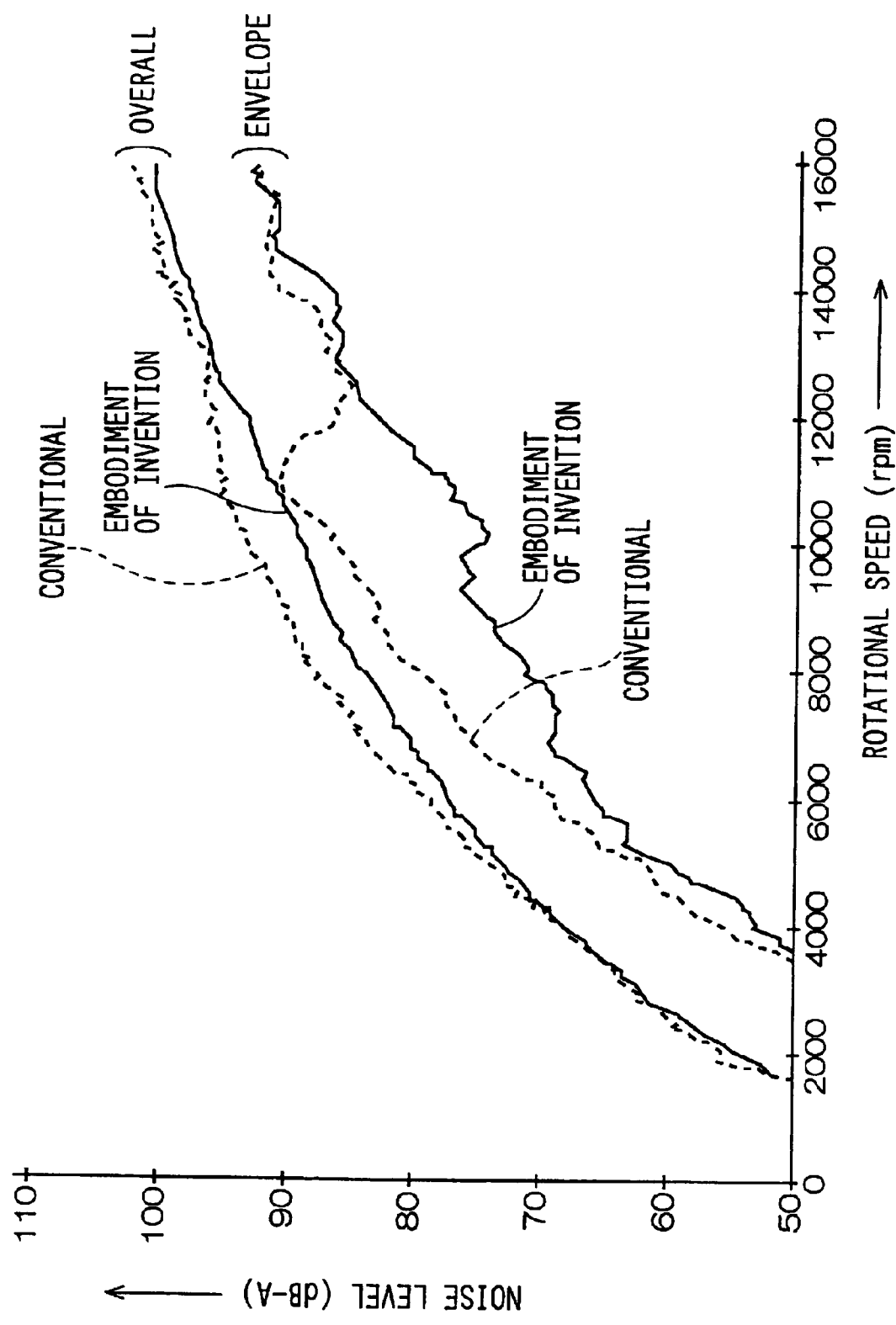
FIG. 4 is a graph showing airflow noise levels in terms of an overall value and an envelope value, the noise levels of an embodiment of the present invention being compared with those of a conventional alternator.

FIG. 4 shows the airflow noise levels in terms of dB-A at various rotational speeds (rpm). In the graph, an overall noise level and an envelope noise level (a noise level enveloping respective order components) are shown. A solid line shows the noise level of the alternator 1 according to the present invention, and a dotted line shows the noise level of a conventional alternator in which the spokes are not tilted (tilt angle α=0°). The graph shows results of actual measurements. It is clear from the graph that airflow noise levels are improved in the alternator according to the present invention in both of the overall level and the envelope level. Especially, the noise levels are much improved in a rotational speed range from 5000 rpm to 12,000 rpm.

Figure 5:
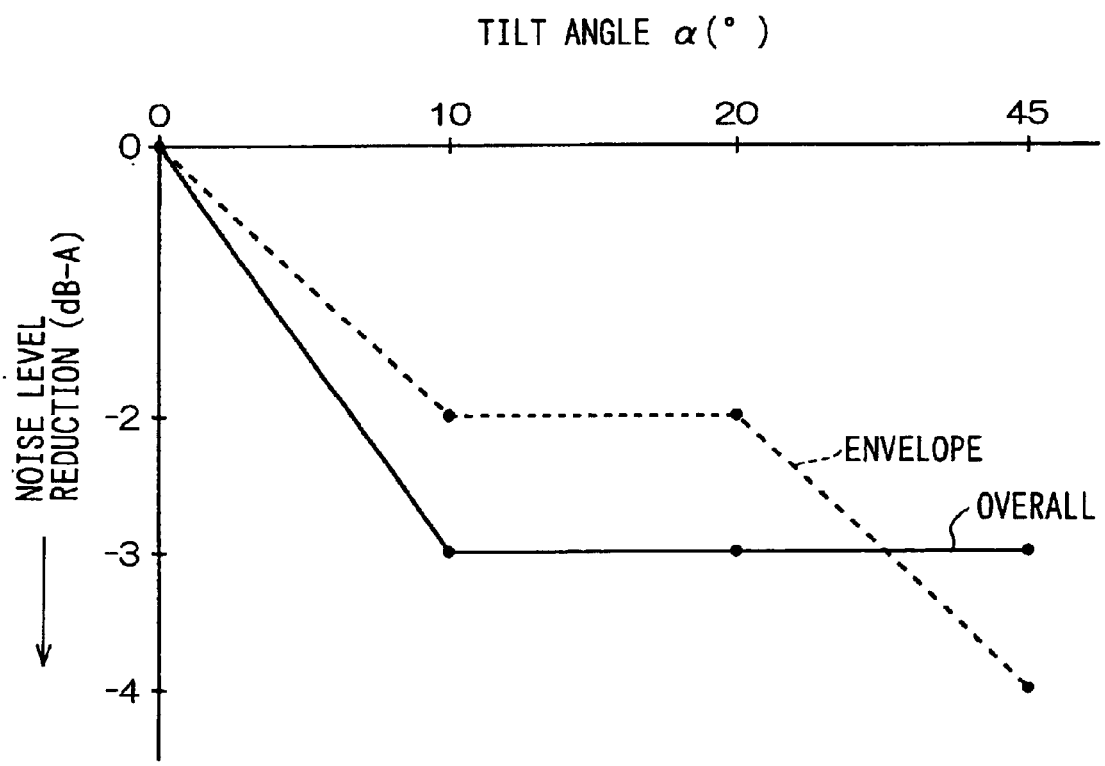
FIG. 5 is a graph showing an amount of the airflow noise reduction in alternators having various tilt angles of spokes.

FIG. 5 shows results of the tests for measuring amounts of the noise level reduction in the alternators having various tilt angles α. The amount of the noise level reduction, which is a difference between the noise level of the conventional alternator having no tilt angle and the noise level of the alternator having a respective tilt angle of 10°, 20° or 45°, is shown on the ordinate. On the abscissa, the tilt angle α is shown. The solid line shows the overall value and the dotted line shows the envelope value. It is confirmed that the noise levels are reduced by tilting the spokes 430 in a range from 10° to 45°. More particularly, the noise level of the overall value is reduced by 3 (dB-A), and that of the envelope value is reduced by 2–4(dB-A).

The larger the tilt angle α becomes, the smaller the opening area of the inlet ports 440 becomes. Therefore, it is most preferable to set the tilt angle α in a range from 10° to 25° to attain a desired noise level reduction while maintaining the opening area of the inlet ports 440 at a sufficient level.

According to the present invention, the spokes 430, which are larger in both the height and the width than the ribs 432, are tilted in a direction opposite to the rotational direction of the rotor with respect to the radial direction. By tilting the spokes 430 in this manner, the cooling airflow disturbance generated in the vicinity of the inlet ports 440 is suppressed to a minimum level. Therefore, the airflow noise level around the inlet ports 440 can be reduced. It is found out through experiments that a considerable noise level reduction is attained by setting the tilt angle α in a range from 10° to 45°.

Figure 6:
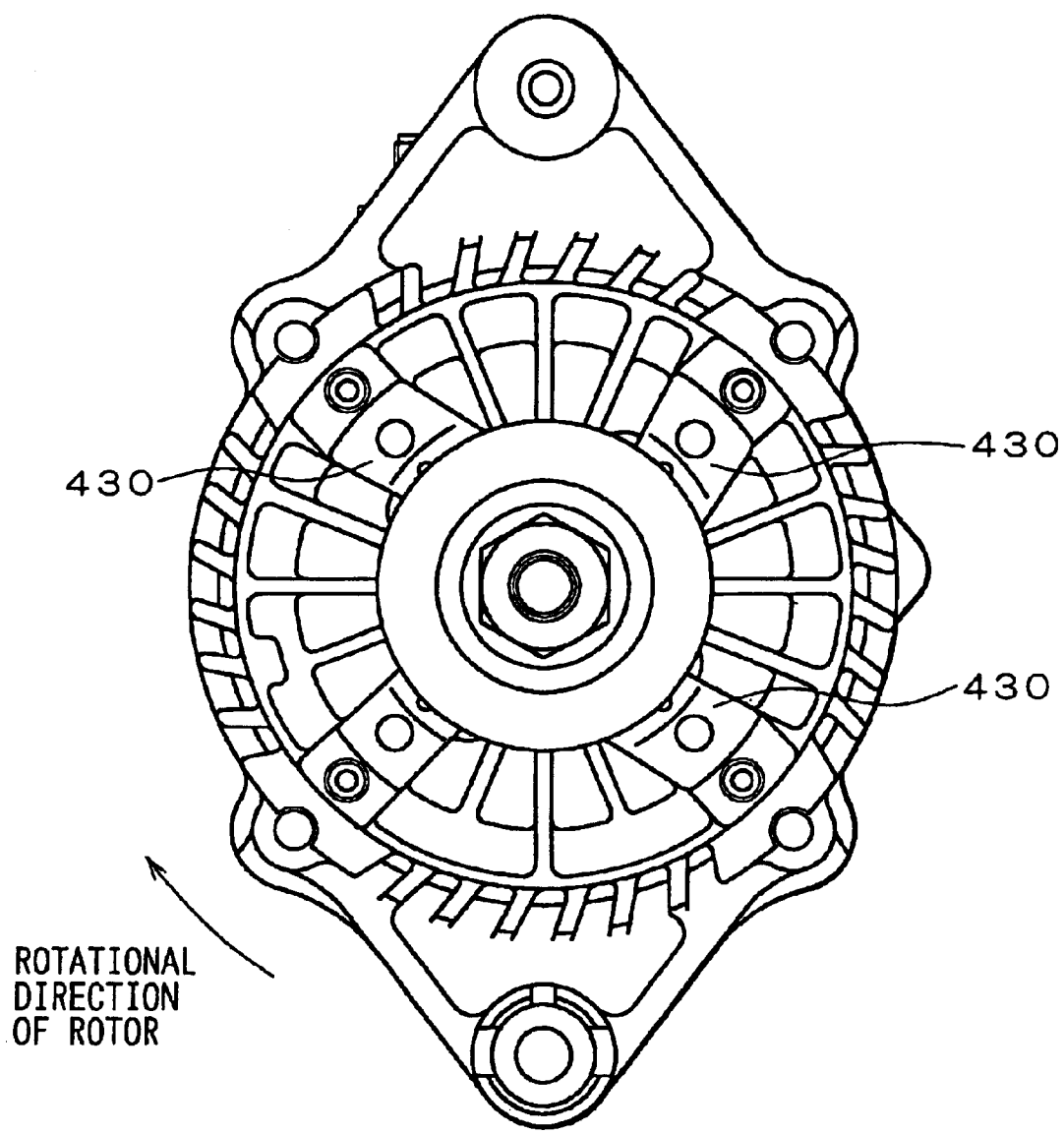
FIG. 6 is a plan view showing an alternator having a front housing in which some of spokes are tilted, viewed from a front side of the alternator.
Figure 7:
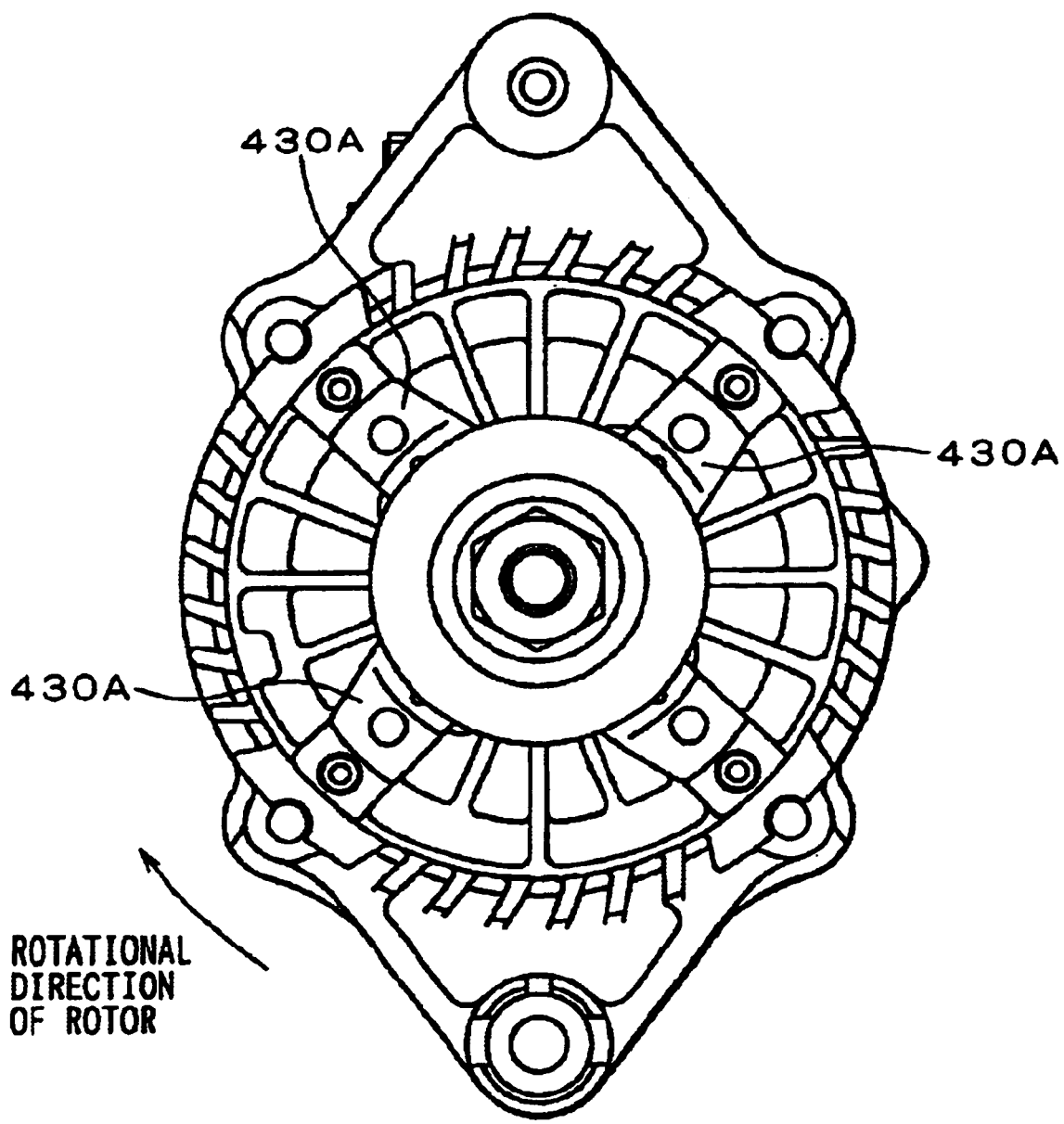
FIG. 7 is a plan view showing an alternator having a front housing in which only one side of spokes is tilted, view from a front side of the alternator.

The present invention is not limited to the embodiment described above, but it may be variously modified. For example, some of the spokes 430, instead of all of the spokes, may be tilted as shown in FIG. 6. In the alternator shown in FIG. 6, three spokes 430 are tilted and one spoke is not tilted. A reduction in the noise level to a certain extent can be attained in this manner. Though both sides of each spoke 430 are tilted in the embodiment described above, it is also possible to tilt only one side of the spoke which is positioned downstream of the rotational direction of the rotor 2. The spoke 430A, only one side of which is tilted, is shown in FIG. 7. The noise reduction can be attained in this manner, too.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An alternator for use in an automotive vehicle, the alternator comprising:

a housing formed in a substantially cylindrical shape having an axial end wall;

a stator fixedly disposed in the housing;

a rotor rotatably supported inside the stator, the rotor including a cooling fan fixed to its axial end surface, wherein:

a plurality of spokes are formed on the axial end wall of the housing;

air inlet ports facing the cooling fan are formed between neighboring spokes, so that cooling air is introduced into the housing through the inlet ports according to rotation of the cooling fan fixed to the rotor;

a plurality of ribs are formed between the neighboring spokes, the spokes being larger in both the height and the width than the ribs and having a larger mechanical strength than the ribs; and the spokes are tilted in a direction opposite to a rotational direction of the rotor with respect to a radial line extending from a rotational center of the rotor.

2. The alternator as in claim 1, wherein:

the spokes are tilted by a tilt angle in a range from 10° to 45°.

3. The alternator as in claim 2, wherein:

the tilt angle is set not to exceed 25°.

4. The alternator as in claim 1, wherein:

only some of the plurality of spokes are tilted while other spokes are not tilted.

5. An alternator for use in an automotive vehicle, the alternator comprising:

a housing formed in a substantially cylindrical shape having an axial end wall;

a stator fixedly disposed in the housing;

a rotor rotatably supported inside the stator, the rotor including a cooling fan fixed to its axial end surface, wherein:

a plurality of spokes are formed on the axial end wall of the housing;

air inlet ports facing the cooling fan are formed at both sides of the spokes, so that cooling air is introduced into the housing through the inlet ports according to rotation of the cooling fan fixed to the rotor; and the spokes are tilted in a direction opposite to a rotational direction of the rotor with respect to a radial line extending from a rotational center of the rotor; and only one side of the spokes which is positioned downstream of the rotational direction of the rotor is tilted.

* * * * *